United States Patent [19]

Iida

[11] Patent Number: 5,052,073
[45] Date of Patent: Oct. 1, 1991

[54] BACKPACK-TYPE POWER WORKING MACHINE
[75] Inventor: Giichi Iida, Tokyo, Japan
[73] Assignee: Kioritz Corporation, Tokyo, Japan
[21] Appl. No.: 644,660
[22] Filed: Jan. 23, 1991
[30] Foreign Application Priority Data Jan. 24, 1990 [JP] Japan ................. 2-4669[U]

[51] Int. Cl.⁵ ............................ A47L 5/36
[52] U.S. Cl. .................... 15/327.5; 15/405; 417/234
[58] Field of Search ............ 15/405, 327.5; 417/234
[56] References Cited

U.S. PATENT DOCUMENTS

| | | | |
|---|---|---|---|
| 4,325,162 | 4/1982 | Chambers et al. | 15/327.5 |
| 4,658,778 | 4/1987 | Gamoh et al. | 417/234 X |
| 4,809,502 | 3/1989 | Iida et al. | 60/316 |
| 5,011,058 | 4/1991 | Sapp et al. | 15/327.5 X |

OTHER PUBLICATIONS

CSI (Chain Saw Industry) & Power Equipment Dealer, May 1977, pp. 8, 9, 39.
"Look, Up in the Sky"; Washington Star, 9-23-77.

Primary Examiner—Chris K. Moore
Attorney, Agent, or Firm—Browdy and Neimark

[57] ABSTRACT

A backpack-type power working machine comprising: a carrying frame having side guard sections on both sides thereof, a fan attached to the carrying frame through intermediation of vibration-damping members, an engine connected to the fan, and an air cleaner having side end sections and situated at a position behind the fan and above the engine, the side end sections of the air cleaner being respectively attached to the side guard sections of the carrying frame.

2 Claims, 3 Drawing Sheets

BACKPACK-TYPE POWER WORKING MACHINE

BACKGROUND OF THE INVENTION

This invention relates to a backpack-type power working machine.

Generally speaking, a backpack-type power working machine, such as a backpack-type power blower cleaner, is equipped with a shoulder frame which allows the operator to carry the machine while working. Those machine components of the working machine which are relatively heavy and which generate vibration, e.g., the fan and the engine, are attached to this shoulder frame through the intermediation of a vibration isolating means such as vibration damping rubber members. An example of such a shoulder frame is composed of a main frame section with side guard sections on both sides thereof, which are integrally formed of plastic. This conventional shoulder frame is considered advantageous because of its low cost of production and assembly. However, the side guard sections of this conventional shoulder frame are rather weak. Furthermore, if the vibration-damping rubber members, mentioned above, should incur damage, there is the danger of the associated fan, engine, etc. being dropped from the carrying frame. In addition, since the air cleaner of the associated engine is attached to the engine, which constitutes the vibration source, the mounting members of the air cleaner are liable to be vibrated loose by the engine, resulting in air leakage, etc.

SUMMARY OF THE INVENTION

It is accordingly an object of this invention to provide a backpack-type working machine which eliminates the above-mentioned problems in the prior art and which has a simple and convenient structure.

In accordance with this invention, there is provided a backpack-type power working machine comprising: a carrying frame having side guard sections on both sides thereof, a fan attached to the carrying frame through the intermediation of vibration-damping members, an engine connected to the fan, and an air cleaner having side end sections on both sides thereof and situated at a position behind the fan and above the engine, the side end sections of the air cleaner being respectively attached to the side guard sections of the carrying frame.

With this construction, the air cleaner helps to reinforce the carrying frame, and, at the same time, is insulated from the vibration of the fan and the engine. Furthermore, if the vibration-damping member should incur damage and cause the fan and the engine to be separated from the main frame section of the carrying frame, there is no danger of the fan and the engine being dropped immediately since the fan would get caught by the air cleaner. Thus, the air cleaner serves as a reinforcing member for the carrying frame, so that, with this construction, there is no need even for a light and relatively weak carrying frame to be equipped with an additional reinforcing member. Thus, with the backpack-type power working machine of this invention, which has a simple structure and which is economical to produce, any trouble in the air cleaner due to vibration can be completely eliminated, and, at the same time, the fan and the engine are prevented from being dropped.

DETAILED DESCRIPTION OF THE PREFERRED EMBODIMENT

Figure 1:
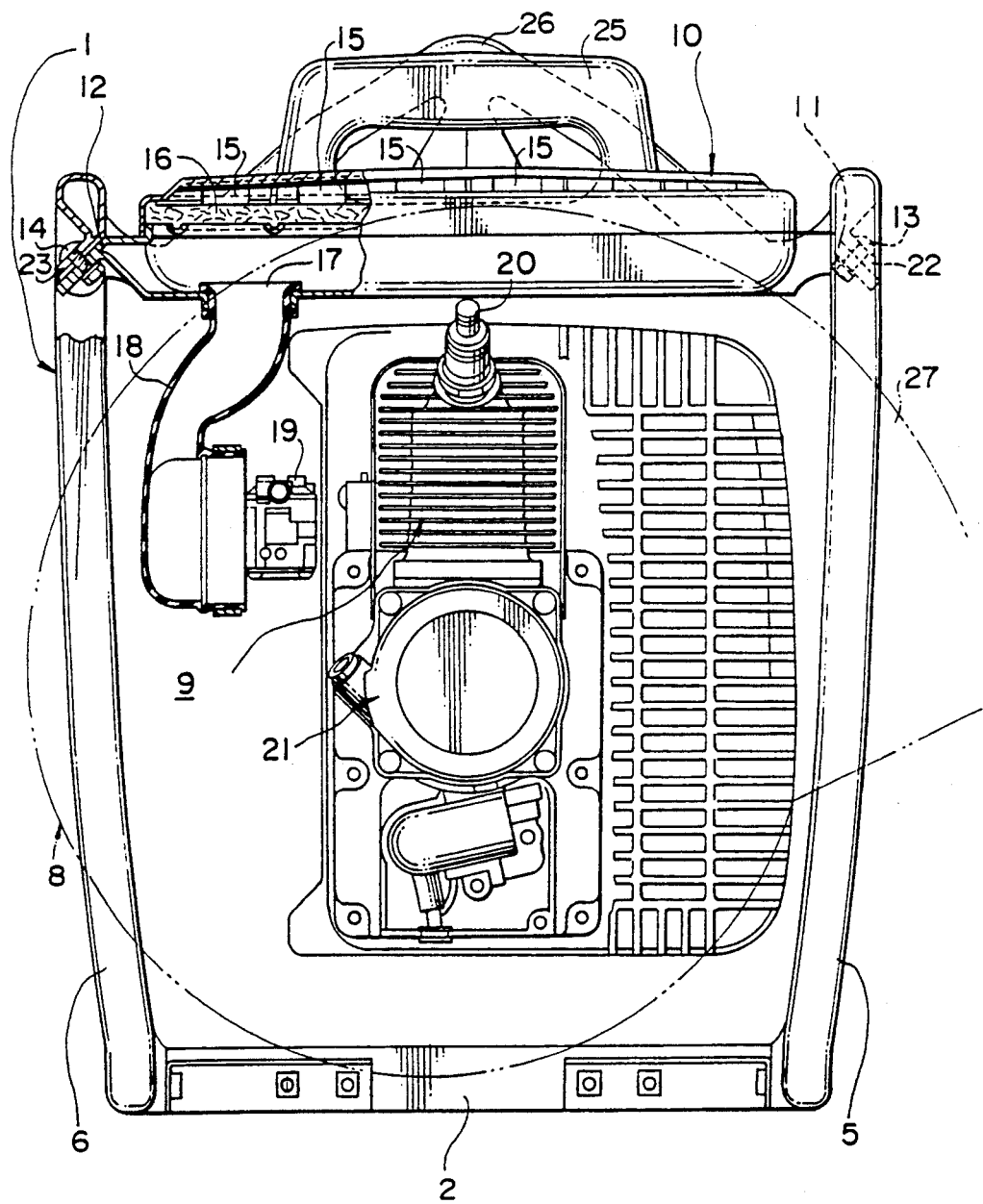
FIG. 1 is a partially sectioned rear view of a backpack-type power blower cleaner which constitutes an embodiment of this invention.
Figure 2:
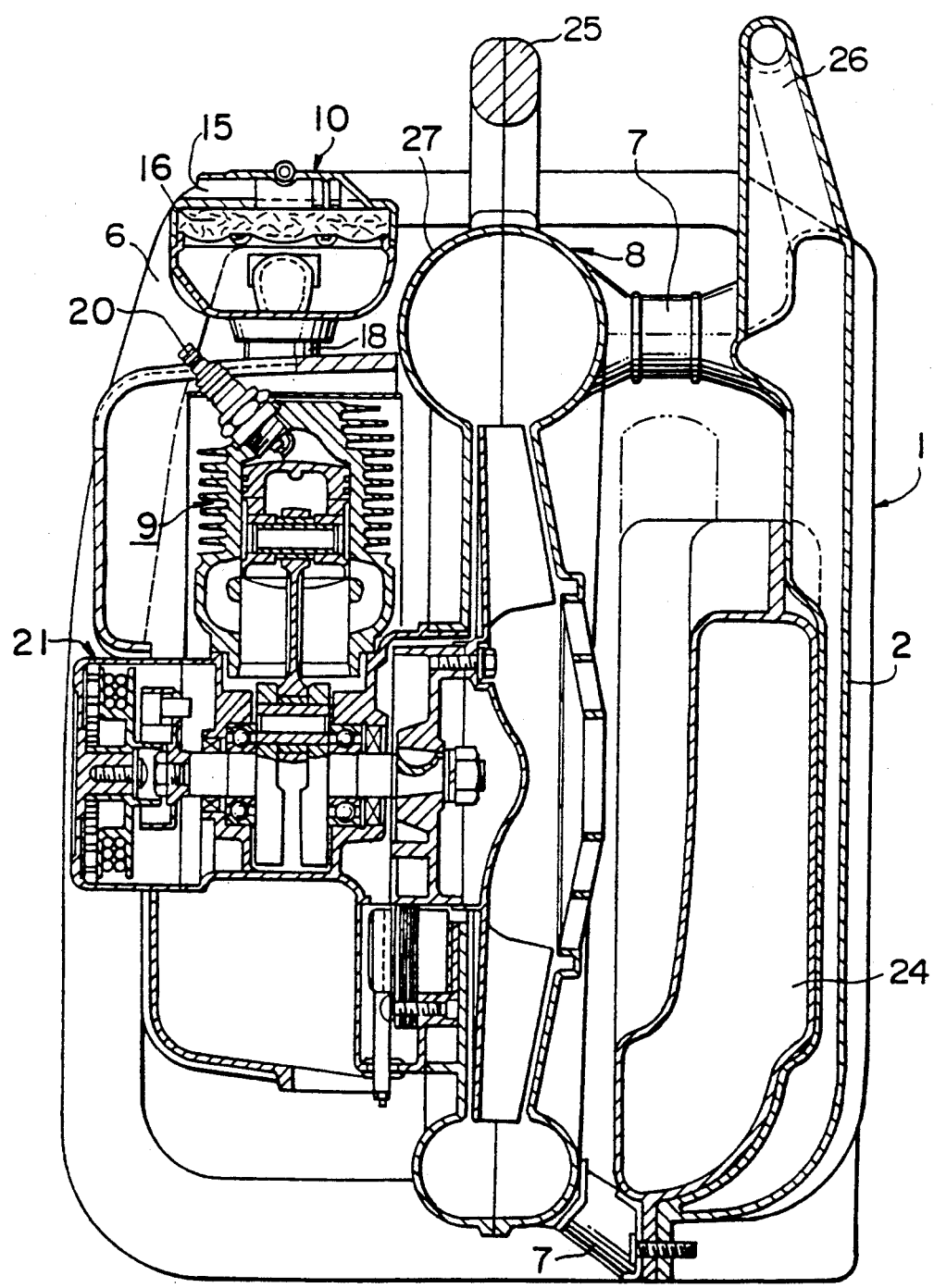
FIG. 2 is a sectional side view of the backpack-type power blower cleaner of FIG. 1.
Figure 3:
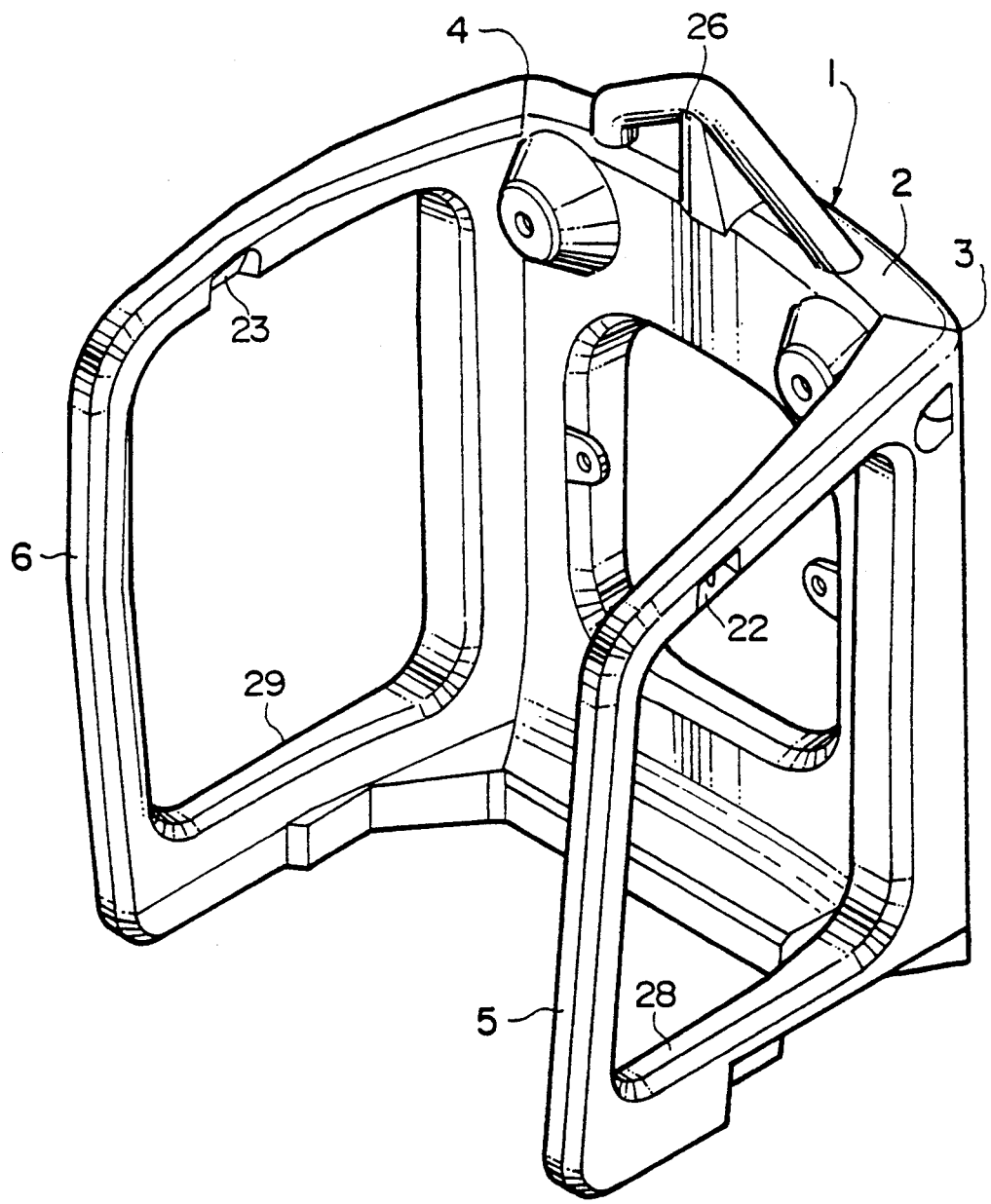
FIG. 3 is a perspective view of the carrying frame of the backpack-type power blower cleaner of FIG. 1.

An embodiment of this invention will now be described with reference to the accompanying drawings.

The embodiment is shown as applied to a backpack-type power blower cleaner. It includes a carrying frame 1, which is composed of a main frame section 2 to be held against the back of an operator and side guard sections 5 and 6, which are formed on both sides of the main frame section 2 and bent rearwards at thin-walled sections 3 and 4 integrally formed with the main frame section 2. The entire carrying frame 1 is integrally formed of a plastic material into a U-shape. A fan 8 and an air-cooled two-cycle gasoline engine 9 which is connected to the fan 8 are attached to this main frame section 2 of the carrying frame 1, constructed as described above, through the intermediation of an appropriate number of vibration-damping rubber members 7 or the like. The engine 9, which serves as the driving means, is situated behind the fan 8. The vibration damping rubber members 7 serve to prevent the vibration of the fan 8 and the engine 9 from being transmitted to the carrying frame 1 and the operator carrying it.

An air cleaner 10, which is the form of a horizontally elongated box, is arranged at a position above the engine 9 and behind the volute case 27 of the fan 8. This air cleaner 10, which extends across the side guard sections 5 and 6, has side end sections 11 and 12, which are respectively attached to mounting sections 22 and 23 provided in the respective upper sections of the side guard sections 5 and 6 by means of screws 13 and 14, respectively. Thus, the air cleaner 10 is attached to the carrying frame 1 which is protected from vibration, which means the air cleaner 10 is insulated from the vibration of the fan 8 and the engine 9. This air cleaner 10 sucks air from outside through a plurality of tubular sucking holes 15, which are so formed as to diminish noise. The air thus sucked in is cleaned while passing through a sponge-like filter 16 and is supplied through an outlet 17 and a flexible duct 18 to the carburetor 19 of the engine 9. The reference numeral 20 indicates a spark plug of the engine 9. The reference numerals 21 and 24 indicate a recoil-type starter (whose grip situated at the outer end of a rope thereof is not shown), and a fuel tank, respectively.

The reference numeral 26 indicates a strap attaching section where the upper ends of the carrying strap (not shown) are attached.

With this construction, the side guard sections 5 and 6 on both sides of the carrying frame 1 are connected to each other by the air cleaner 10, thereby reinforcing the entire frame 1. Furthermore, since it is insulated from the vibration of the fan 8 and the engine 9, the air cleaner 10 can operate constantly in a satisfactory condition without involving any trouble. In addition, if the vibration-damping rubber members 7 should incur damage and cause the fan 8 and the engine 9 to be separated from the main frame section 2 of the carrying frame 1, the large-diameter volute case 27 of the fan 8 would get caught by the air cleaner 10, so that the fan 8 and the engine 9 are prevented from being dropped immediately, thus securing operational safety.

The operational safety of the power blower cleaner can be further enhanced if, as in the example shown, a carrying grip 25 protrudes from the top end of the volute case 27, or if both side sections of the volute case 27 are respectively fitted into the openings 28 and 29 provided in the side guard sections 5 and 6 of the carrying frame 1.

What is claimed is:

1. A backpack-type power working machine comprising: a carrying frame having side guard sections on both sides thereof, a fan attached to said carrying frame through intermediation of vibration-damping members, an engine connected to said fan, and an air cleaner having side end sections and situated at a position behind said fan and said engine, said side end sections of said air cleaner being respectively attached to said side guard sections of said carrying frame.

2. A backpack-type power working machine as claimed in claim 1, wherein said carrying frame is composed of a main frame section to be held against back of an operator and said side guard sections, which are formed on both sides of said main frame section and bent rearwards at thin-walled sections integrally formed with said main frame section, said entire carrying frame being integrally formed of plastic, with said main frame section and said side guard sections being connected to each other so that said entire carrying frame may be formed into a U-shape when seen from above.

* * * * *